UNITED STATES PATENT OFFICE 2,503,390

ALKYL MONO-NITROPHENYL THIONOBEN-ZENE-PHOSPHONATES AND INSECTICIDAL COMPOSITIONS CONTAINING THE SAME

Arthur G. Jelinek, Wilmington, Del., assignor to E. I. du Pont de Nemours & Company, Wilmington, Del., a corporation of Delaware No Drawing. Application July 1, 1948, Serial No. 36,421

10 Claims. (Cl. 167—30)

This invention relates to four alkyl mononitrophenyl thionobenzenephosphonates; namely, methyl o-nitrophenyl thionobenzenephosphonate, methyl p-nitrophenyl thionobenzenephosphonate, ethyl o-nitrophenyl thionobenzenephosphonate, and ethyl p-nitrophenyl thionobenzenephosphonate. More specifically the invention relates to compositions and methods employing the above thionobenzenephosphonates for the control of insects and particularly for the control of mites.

This application is a continuation-in-part of my copending applications, Serial Nos. 23,409 and 23,411, both filed April 26, 1948, each of which are now abandoned.

The alkyl mono-nitrophenyl thionobenzenephosphonates of the invention hereinafter referred to more briefly as the thionobenzenephosphonates of the invention are represented by the formula (1) 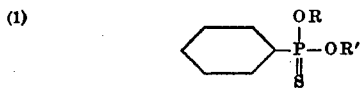

where R is methyl or ethyl and R' is o-nitrophenyl or p-nitrophenyl.

The thionobenzenephosphonates of the invention are suitably prepared, for example, by a two-step process. The process is illustrated below with particular reference to the preparation of the compound ethyl p-nitrophenyl thionobenzenephosphonate but it will be understood that by suitable choice of the reactants the other thionobenzenephosphonates of the invention are similarly prepared.

In the first step sodium ethylate is reacted with thionobenzenephosphonyl dichloride to give ethyl thionobenzenephosphonyl monochloride. In the second step, ethyl thionobenzenephosphonyl monochloride is reacted with sodium p-nitrophenate to give the product. The reactions are:

(2) 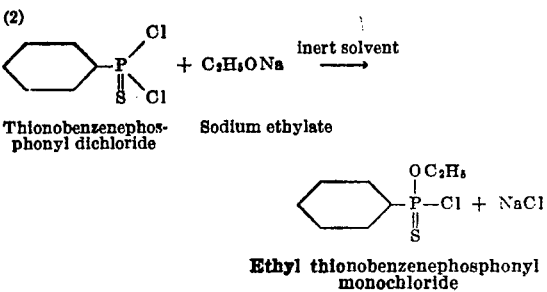

Thionobenzenephosphonyl dichloride   Sodium ethylate

Ethyl thionobenzenephosphonyl monochloride (3) 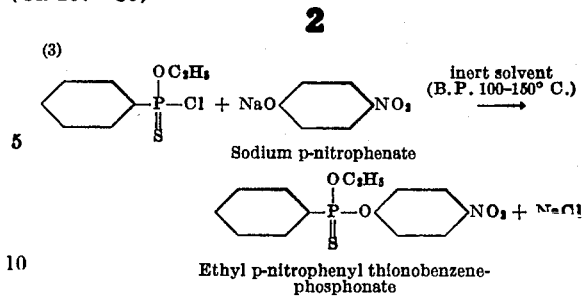

Sodium p-nitrophenate

Ethyl p-nitrophenyl thionobenzenephosphonate

The first step of the reaction as illustrated in Equation 2 proceeds readily at room temperature. Instead of using sodium ethylate as a reactant, ethanol may be used. If ethanol is used instead of sodium ethylate, then a hydrogen chloride acceptor such as pyridine is also used in the reaction. The reaction of Equation 2 is suitably effected in the presence of an inert solvent such as benzene or chlorobenzene.

The reaction illustrated in Equation 3 is preferably carried out at an elevated temperature, say 100 to 150° C., in the presence of an inert solvent. Chlorobenzene is particularly suitable as a solvent because of its convenient boiling point since the reaction can be carried out at atmospheric pressure in the presence of chlorobenzene by refluxing at a temperature of about 130° C.

The thionobenzenephosphonate of the invention is recovered from the reaction mass of Equation 3 by filtering off the insoluble sodium chloride and distilling off the solvent.

The thionobenzenephosphonates of the invention prepared according to the steps illustrated above are oily liquids having a light yellow color and are obtained in good yield. While the product so obtained is not highly refined, analysis of it conforms closely to the calculated value. Further refinement of the product is difficult because it is not easily distilled nor is crystallization readily induced by cooling.

The thionobenzenephosphonates of the invention are effective as toxicants for the control of a wide variety of insects. They are unusually effective in the control of mites and are particularly well-suited for use in agriculture for applying to growing crops for the control of insects and mites. They not only kill the adult mites but also kill their eggs. Applications of the compounds exhibit considerable residual action.

While mites are not insects in the strict classification of the animal kingdom, the terms "insect" and "insecticide" are used herein to include mites. This usage conforms to the definitions provided by Congress in Public Law 104, the "Federal Insecticide, Fungicide, and Rodenticide Act" of 1947, Section 2, sub-section h. Thus the term "insect" refers not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes and wood lice.

The insecticidal compositions of the invention are prepared by admixing the thionobenzenephosphonates of the invention with suitable insecticidal adjuvants to provide compositions in the form of solutions, dusts, water-dispersible powders and aqueous dispersions or emulsions.

By the term "insecticidal adjuvant," I mean a substance which is capable of presenting or aiding in the presentation of an insect toxicant to an insect. The term "adjuvant" is well established in the art where it is recognized that an active agent or toxicant is in itself of little practical utility for combatting insects unless it be presented in a form suitable for effecting intimate contact of the agent or its vapors, as the particular case may require, with the insect. Thus additional material or materials are employed in the formulation of an active agent to yield a suitable insecticidal composition, such materials being adjuvants.

Insecticidal adjuvants such as the dusts, solvents, wetting, dispersing and emulsifying agents set out in the United States Patent 2,426,417 may be employed in the preparation of the insecticidal compositions of the present invention. Other wetting, dispersing, and emulsifying agents; such as those listed in detail in Bulletin E-607 of the Bureau of Entomology and Plant Quarantine of the U. S. Dept. of Agriculture and such as those set out in an article by McCutcheon in Chemical Industries, November 1947, page 811, entitled "Synthetic detergents," may also be used.

Preferably the compositions of the invention are in the form of "concentrates" suitable for dispersion in water to give aqueous spray compositions. A suitable emulsifiable oil concentrate is obtained, for example, by adding a dispersing or emulsifying agent to a thionobenzenephosphonate of the invention. Preferably the dispersing or emulsifying agent is one which is soluble in the compound and ordinarily the agent will not comprise more than 10% by weight of the emulsifiable oil composition and with the better adjuvant materials, the percentage will be 5% or less.

Less concentrated emulsifiable oil concentrates are prepared by dissolving a thionobenzenephosphonate of the invention and a wetting, dispersing, and emulsifying agent in a suitable solvent. Care should be taken, however, in the selection of a solvent if the composition is to be applied to foliage since, as those skilled in the insecticide art know, many of the common solvents tend to injure plants.

Dust compositions of the invention contain a thionobenzenephosphonate of the invention adsorbed on finely divided carriers or dusts such as talc, pyrophyllite, natural clays, diatomaceous earths, and other powdered diluents such as those set out in the aforementioned U. S. patent.

The dust compositions of the invention are prepared by mixing intimately the liquid thionobenzenephosphonates of the invention with the powdered carrier. Alternatively, the toxic compound may be dissolved in a volatile solvent such as acetone and the solution thus obtained then mixed with the powdered carrier and the solvent subsequently removed from the composition by evaporation.

The maximum concentration of the toxicant in the dust composition or water-dispersible powder will, of course, vary with the adsorptivity of the particular powdered diluent used. For example, if fuller's earth is used, the dust may contain as much as about 40% of the liquid toxicant. Using a less adsorptive diluent such as pyrophyllite, however, it is necessary to reduce the content of the liquid toxicant appreciably in order to obtain a free-flowing powdered insecticidal composition.

Preferred water-dispersible powders of the invention contain in the order of about 35% by weight of a thionobenzenephosphonate of the invention dispersed on a highly adsorbent inert powdered diluent such as fuller's earth or diatomaceous earth. Such water-dispersible powders also contain an effective amount of a dispersing or emulsifying agent. Bentonite is well-suited as a dispersing agent for this purpose.

In actual application of the compositions for insect control, it is generally preferred that the toxicant be present in relatively low concentrations. For example, if application of the composition is to be made to vegetation or agricultural crops, the emulsifiable oil concentrate or water-dispersible powdered compositions described above are preferably dispersed in water to obtain aqueous suspensions or emulsions of suitable concentration.

In applying the compound of the invention for the control of insects, the compound is, of course, applied in amount sufficient to exert an insecticidal action. The amounts required, however, are extremely small because of the unusual effectiveness of the toxicants; for example, as high as 94% kill of adult mites has been obtained under controlled conditions by the application of ethyl o-nitrophenyl thionobenzenephosphonate at a concentration of 0.00025%. In normal usage, however, such as in applications of the compositions to agricultural crops for the control of mites and other insects, the toxicant is suitably applied at a concentration of from about 0.0005% to about 3%. More preferably if the treatment is made for the control of mites by spraying an aqueous emulsion of an emulsifiable oil concentrate or an aqueous dispersion of a concentrated water-dispersible powder of the type previously described, the concentration of the toxicant in the spray composition is from about 0.001 to 0.01%.

The toxicant is applied either as a spray or a dust to the locus or area to be protected. Such application may be made directly upon the locus or area and the insects thereon during the period of infestation or, alternatively, the application may be made in advance of an anticipated insect infestation or otherwise applied so that the insects will come into contact with the toxic residue and be killed.

The compositions of the invention may include fungicides such as zinc dimethyl dithiocarbamate, zinc ethylene bis-dithiocarbamate, and manganese ethylene bis-dithiocarbamate; insecticides such as DDT, 2,2-bis-(para-methoxyphenyl)-1,1,1 - trichloroethane (methoxychlor), and 1,2,4,5,6,7,8,8 - octachloro-4,7-methane-3a,4,7,7a- tetrahydroindane (chlordane); and other fungicides and insecticides such as those set out in U. S. Patent 2,426,417.

The invention is illustrated by the following examples:

EXAMPLE I

*Methyl o-nitrophenyl thionobenzenephosphonate*

52.8 grams of thionobenzenephosphonyl dichloride, 19.8 grams of pyridine and 100 ml. of benzene were mixed in a flask. While stirring this mixture 8 grams of absolute methanol was added dropwise to form a reaction mass. The reaction mass was maintained at about room temperature during the methanol addition and was stirred for about two hours after the completion of the methanol addition keeping it at about room temperature.

The reaction mass was then poured into ice water and washed several times with cold water to remove pyridine hydrochloride. The benzene layer was then dried over anhydrous sodium sulfate. The dried benzene solution was heated under reduced pressure at a temperature of about 35–40° C. to distill off benzene. There was thus obtained 42.4 grams of methyl thionobenzenephosphonyl monochloride, a clear, colorless oil. $n_D^{31.5}=1.5842$.

31.0 grams of the methyl thionobenzenephosphonyl monochloride, prepared as above, was mixed with 24.4 grams of sodium o-nitrophenate in 75 ml. of dry monochlorobenzene and the mixture was heated at reflux temperature for about four hours at the end of which time the red color of the sodium o-nitrophenate had disappeared. The reaction mass was then cooled and filtered to remove suspended sodium chloride. The chlorobenzene solvent was removed under vacuum at steam bath temperature. The product, methyl o-nitrophenyl thionobenzenephosphonate, remaining weighed 34.5 grams. The product is a very viscous, light yellow-colored oil. $n_D^{31}=1.6061$; $d_4^{25}=1.329$. Analysis: N found 4.56%, calculated 4.54%; S found 10.39%, calculated 10.3%.

EXAMPLE II

*Methyl p-nitrophenyl thionobenzenephosphonate*

The process steps described in Example I were repeated except that sodium p-nitrophenate was used in place of sodium o-nitrophenate. Otherwise the reagents and the amounts employed were identical. The product, methyl p-nitrophenyl thionobenzenephosphonate, which was obtained weighed 33 grams. It is a light yellow-colored oil but not nearly as viscous as the methyl o-nitrophenyl thionobenzenephosphonate. $n_D^{31}=1.6100$; $d_4^{25}=1.329$. Analysis: N found 4.56%, calculated 4.54%; S found 9.87%, calculated 10.3%.

EXAMPLE III

*Ethyl o-nitrophenyl thionobenzenephosphonate*

Over a period of about ½ hour 34.5 grams of absolute ethanol was added dropwise to a stirred mixture of 158.3 grams of thionobenzenephosphonyl dichloride and 59.4 grams of pyridine in 300 ml. of dry benzene while applying external cooling to maintain the reacting mass at about room temperature.

After completing the addition of absolute ethanol, the mixture was stirred for several hours at about room temperature and was then poured into ice water. The benzene layer was washed several times with water and finally dried over anhydrous sodium sulfate. The benzene solvent was removed by distillation under reduced pressure at temperature not exceeding 35–40° C. There was thus obtained 184 grams (90% yield) of ethyl thionobenzenephosphonyl monochloride, a colorless oil. $n_D^{25}=1.5728$. Analysis: P found 14.01%, calculated 14.05%; Cl found 15.86%, calculated 16.1%.

22.0 grams of ethyl thionobenzenephosphonyl monochloride, prepared as above, was mixed with 16.1 grams of sodium o-nitrophenate in 50 ml. of dry monochlorobenzene and the mixture was stirred at reflux temperature until the red color of the sodium o-nitrophenate had disappeared (about 4 hours). The reaction mass was then cooled to room temperature and filtered to remove suspended sodium chloride. The chlorobenzene solvent was then removed by distillation under reduced pressure at steam bath temperature. The crude, undistilled product, ethyl o-nitrophenyl thionobenzenephosphonate, remaining weighed 24.3 grams. The product is a very viscous, light yellow-colored oil which has a tendency to gel on standing. $n_D^{32}=1.5912$; $d_4^{30}=1.238$. Analysis: N found 4.37%, calculated 4.34%; S found 10.10%, calculated 9.92%.

EXAMPLE IV

*Ethyl p-nitrophenyl thionobenzenephosphonate*

Ethyl thionobenzenephosphonyl monochloride was reacted with sodium p-nitrophenate, according to the process steps described in Example III, to give ethyl p-nitrophenyl thionobenzenephosphonate. In this reaction the ingredients were used in the following amounts: ethyl thionobenzenephosphonyl monochloride, 110.3 grams; sodium p-nitrophenate, 81.5 grams; and dry monochlorobenzene, 250 ml. The ethyl p-nitrophenyl thionobenzenephosphonate product obtained weighed 145 grams (90% yield). The product is a light-yellow colored oil and is much less viscous than the ethyl o-nitrophenyl thionobenzenephosphonate. $n_D^{25}=1.6021$; $d_4^{25}=1.268$. Analysis: P found 9.51%, calculated 9.6%; S found 9.95%, calculated 9.9%.

EXAMPLE V

*Water-dispersible insecticidal powder*

A water-dispersible insecticidal powder is obtained by admixing ethyl o-nitrophenyl thionobenzenephosphonate, prepared as in Example III, with finely divided fuller's earth and bentonite in the following proportions by weight:

35% ethyl o-nitrophenyl thionobenzenephosphonate
5% bentonite
60% fuller's earth The water-dispersible powdered composition of this example is free-flowing and is easily dispersed in water to give a relatively stable suspension in an aqueous spray composition. An excellent spray composition suitable for application to apple trees for the control of mites is obtained by the dispersion of the composition of this example in water in the proportions of 2 ozs. of the composition per 100 gallons of water.

EXAMPLE VI

*Insecticidal emulsifiable oil concentrate*

Methyl o-nitrophenyl thionobenzenephosphonate prepared according to Example I is admixed with 5% by weight of a proprietary wetting, dispersing, and emulsifying agent having as its effective ingredient diethyl cyclohexylamine dodecyl sulfate.

The emulsifiable oil concentrate of this example is readily dispersible in water to obtain aqueous spray compositions which are highly effective in the application to growing crops for the control of a wide variety of insects such as mites, houseflies, cockroaches, aphids, Southern army worms, and onion thrips.

A spray composition suitable for application to fruit trees for the control of mites is obtained by the dispersion of the composition of this example in water in the proportions of ⅔ oz. of the composition per 100 gallons of water.

EXAMPLE VII

Insecticidal dust composition

An insecticidal dust is prepared by admixing ethyl p-nitrophenyl thionobenzenephosphonate, prepared according to Example IV, with talc in the proportions of about 32 parts by weight of talc for each part by weight of the thionobenzenephosphonate.

The dust composition of this example is free-flowing and is easily broadcast over an area to be protected from infestation by mites and other insects.

I claim:

1. An insecticidal composition comprising an insecticidal adjuvant selected from the group consisting of wetting, dispersing and emulsifying agents, and in admixture therewith, in amount sufficient to exert an insecticidal action, an alkyl mono-nitrophenyl thionobenzenephosphonate selected from the group consisting of methyl o-nitrophenyl thionobenzenephosphonate, ethyl o-nitrophenyl thionobenzenephosphonate, methyl p-nitrophenyl thionobenzenephosphonate, and ethyl p-nitrophenyl thionobenzenephosphonate.

2. An alkyl mono-nitrophenyl thionobenzenephosphonate selected from the group consisting of methyl o-nitrophenyl thionobenzenephosphonate, ethyl o-nitrophenyl thionobenzenephosphonate, methyl p-nitrophenyl thionobenzenephosphonate, and ethyl p-nitrophenyl thionobenzenephosphonate.

3. Ethyl p-nitrophenyl thionobenzenephosphonate.

4. Methyl p-nitrophenyl thionobenzenephosphonate.

5. Ethyl o-nitrophenyl thionobenzenephosphonate.

6. Methyl o-nitrophenyl thionobenzenephosphonate.

7. An insecticidal composition comprising methyl o-nitrophenyl thionobenzenephosphonate and an insecticidal adjuvant selected from the group consisting of wetting, dispersing and emulsifying agents.

8. An insecticidal composition comprising ethyl p-nitrophenyl thionobenzenephosphonate and an insecticidal adjuvant selected from the group consisting of wetting, dispersing and emulsifying agents.

9. An insecticidal composition comprising methyl p-nitrophenyl thionobenzenephosphonate and an insecticidal adjuvant selected from the group consisting of wetting, dispersing and emulsifying agents.

10. An insecticidal composition comprising ethyl o-nitrophenyl thionobenzenephosphonate and an insecticidal adjuvant selected from the group consisting of wetting, dispersing and emulsifying agents.

ARTHUR G. JELINEK.

REFERENCES CITED

The following references are of record in the file of this patent:

F. I. A. T. Final Report No. 949, "Organic Chemical Intermediates for Insecticides, Fungicides, and Rodenticides," by J. T. Thurston, dated Oct. 14, 1946, Dept. of Commerce, Office of Pubs. Board. Publication No. PB–60890, pages 19 and 20.